(12) United States Patent
Goldenne et al.

(10) Patent No.: US 8,231,022 B2
(45) Date of Patent: Jul. 31, 2012

(54) RECESSED WALL HOUSING FOR CONCEALING WALL MOUNTED ELECTRICAL DEVICES

(75) Inventors: John P. Goldenne, Inverness, IL (US); Curt Alan Conklin, Chicago, IL (US)

(73) Assignee: Allcova, LLC, Palatine, IL (US)

( * ) Notice: Subject to any disclaimer, the term of this patent is extended or adjusted under 35 U.S.C. 154(b) by 1169 days.

(21) Appl. No.: 11/771,474

(22) Filed: Jun. 29, 2007

(65) Prior Publication Data
US 2009/0001082 A1 Jan. 1, 2009

(51) Int. Cl.
*H02G 3/08* (2006.01)

(52) U.S. Cl. ............ 220/3.8; 220/3.3; 220/3.6; 220/477; 29/428; 174/50; 174/58; 174/63; 174/67

(58) Field of Classification Search ............... 220/3.3, 220/3.6, 3.8, 477; 29/428; 174/50, 58, 63, 174/67
See application file for complete search history.

(56) References Cited

U.S. PATENT DOCUMENTS

| 3,334,770 A | * | 8/1967 | Stanback | 220/326 |
| 2003/0178421 A1 | * | 9/2003 | Almond | 220/3.8 |

* cited by examiner

*Primary Examiner* — Anthony Stashick
*Assistant Examiner* — Elizabeth Volz
(74) *Attorney, Agent, or Firm* — Miller, Matthias & Hull LLP

(57) ABSTRACT

An enclosure adapted to be recessed into a wall is disclosed. The enclosure may include an access frame or base to which an access door or lid is hinged or otherwise movable. The access frame is adapted to be secured to a stud of the wall. The door, in a closed configuration, is adapted to be substantially flush with the wall itself. Accordingly, in a closed configuration, the housing substantially conceals or hides the contents of the enclosure. In certain embodiments, the contents could be wall-mounted electrical devices such as power outlets, thermostats, switches, alarm key pads or audio/visual controls, but in alternative embodiments, the contents can be ordinary objects such as keys, wallets, or the like. In any embodiment set forth herein, a recessed housing is provided to provide for storage space to the user while not substantially disturbing the overall appearance or aesthetics of the room.

20 Claims, 6 Drawing Sheets

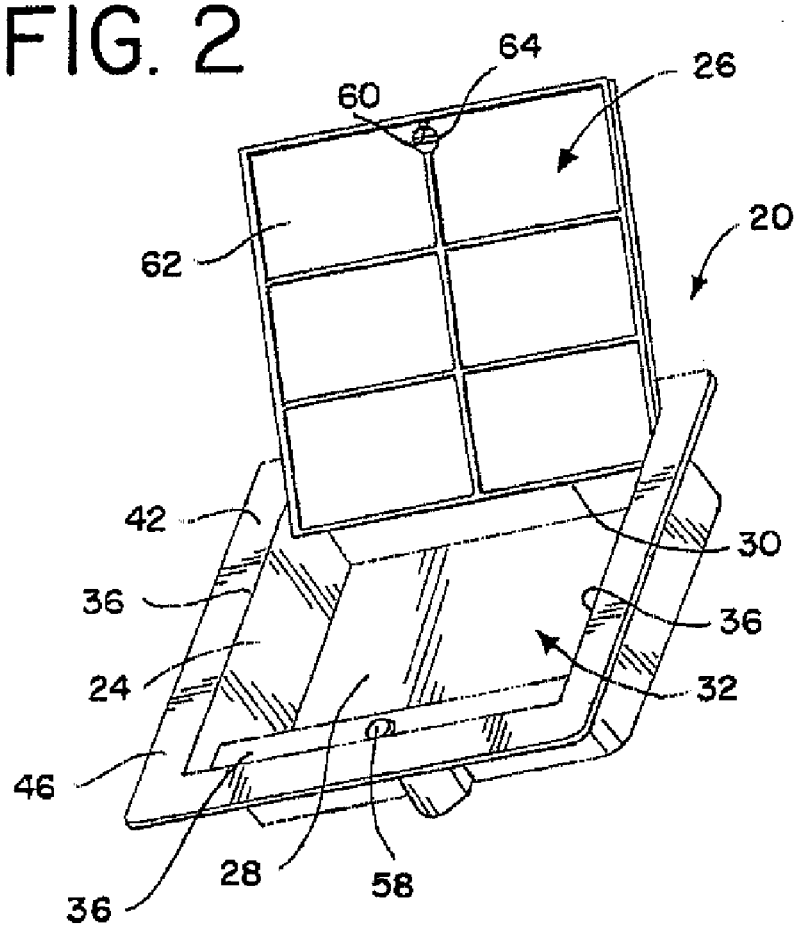
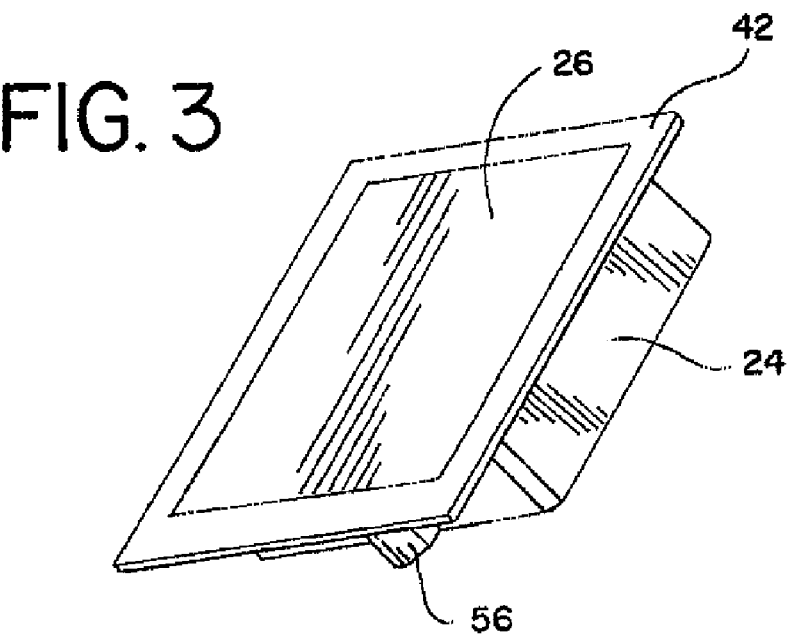

RECESSED WALL HOUSING FOR CONCEALING WALL MOUNTED ELECTRICAL DEVICES

FIELD OF THE DISCLOSURE

The present disclosure generally relates to construction products and, more particularly, relates to a housing for use in enclosing or otherwise concealing a wall mounted electrical device for a home or building.

BACKGROUND OF THE DISCLOSURE

In the construction of modern homes and buildings, it is commonplace to have many wall-mounted electrical devices, such as power outlets, light switches, thermostats, alarm key pads, and home electronic control panels. With respect to thermostats, for example, such devices simply connect the control panel to the furnace or air conditioner of the home or building, and provide the user with a means of turning such equipment on or off by setting a given temperature. Over time, home controls such as thermostats and others have become digitized to enhance the ability of the home owner to control the interior environment of the home. For example, the electronic thermostats can be programmed so as to automatically update the desired temperature throughout the day.

Even above and beyond thermostats, modern homes and buildings have become digitized to allow for many of the features of the home or building to be automatically controlled. In addition to temperature, such control panels can be used to control the lighting, again dependent upon the time of day or presence or absence of any movement within a room. The audio or visual offerings of the home or building can also be so controlled. For example, modern homes may have speakers built into the walls of one or more of the rooms in the house, each of which is connected to a central source of the audio or visual lead. In some instances, a server can be used to store vast quantities of audio or video material which can be called upon by the user at the electronic control panel. In addition, different audio and visual leads can be provided for different zones within the home.

A still further example is a modern electronic control panel provided with a video monitor for accessing various cameras throughout the house. This may be for security purposes, or child rearing purposes, and provide the home owner with the ability to see locations of the home distant from the electronic control panel, e.g., the front door, the backyard, infant's rooms, etc.

While the performance and capability of such wall-mounted electrical devices continues to increase, their aesthetic effect lags behind. As they need to be provided in a centrally located or at least readily accessible fashion so as to allow the home owner or building owner to adjust as needed, they have previously had to be visibly present in at least one room. With respect to alarm pads and home electronic panels, they have conventionally simply hung on a wall at a height comparable to a thermostat. The panel may include some sort of exterior housing with a plurality of user engagable buttons and one or more display panels. While not unattractive, if the panel is displayed in a home, particularly an upscale home, the appearance of such a panel may be out of place, or otherwise detrimentally affect the aesthetics of the room.

There is therefore a need in the market place for a mechanism by which such wall-mounted electrical devices can be concealed from sight to thereby improve the aesthetics of the room, while still being readily accessible by the user.

SUMMARY OF THE DISCLOSURE

In accordance with one aspect of the disclosure, a housing for concealing wall-mounted electrical devices is recessable into a wall and comprises a base and a lid hinged to the base. The base includes a bottom wall from which four side walls extend and form an enclosure with an open top. The lid is movable from at least a first position where the lid extends across the open top of the enclosure parallel to the bottom wall, and a second position where the lid is pulled away from the open top and is non-parallel to the bottom wall of the enclosure.

In accordance with another aspect of the disclosure, an electronic control panel housing assembly is disclosed which comprises a base, a lid hinged to the base, and an electronic control panel positioned within the base. The base includes a bottom wall from which side walls extend and form an enclosure with an open top. The lid is hinged to the base and is movable from at least a first position where the lid extends across the open top parallel to the bottom wall, and a second position where the lid is pulled away from the open top and is non-parallel to the bottom wall. The electronic control panel is positioned within the base against the bottom wall In accordance with another aspect of the disclosure, a method of mounting an electronic control panel into a wall is disclosed which comprises providing an opening in a wall, mounting a base into the wall, positioning the electronic control panel into the base, and closing a lid relative to the base. The base includes a bottom wall from which four side walls extend forming an enclosure with an open top. The bottom wall and side walls are recessed into the opening in the wall. The lid is hinged to the base and is movable from at least a first position where the lid extends across the open top parallel to the bottom wall, and a second position where the lid is pulled away from the open top and is non-parallel to the bottom wall.

These and other aspects and features of the present disclosure will become more readily apparent upon reading the following detailed description when taken in conjunction with the accompanying drawings.

BRIEF DESCRIPTION OF THE DRAWINGS

FIG. 2 is a front perspective view of the housing of FIG. 1, but apart from the wall and in an open position;

FIG. 3 is a perspective view of the housing of FIG. 1, but shown in a closed position;

Figure 1:
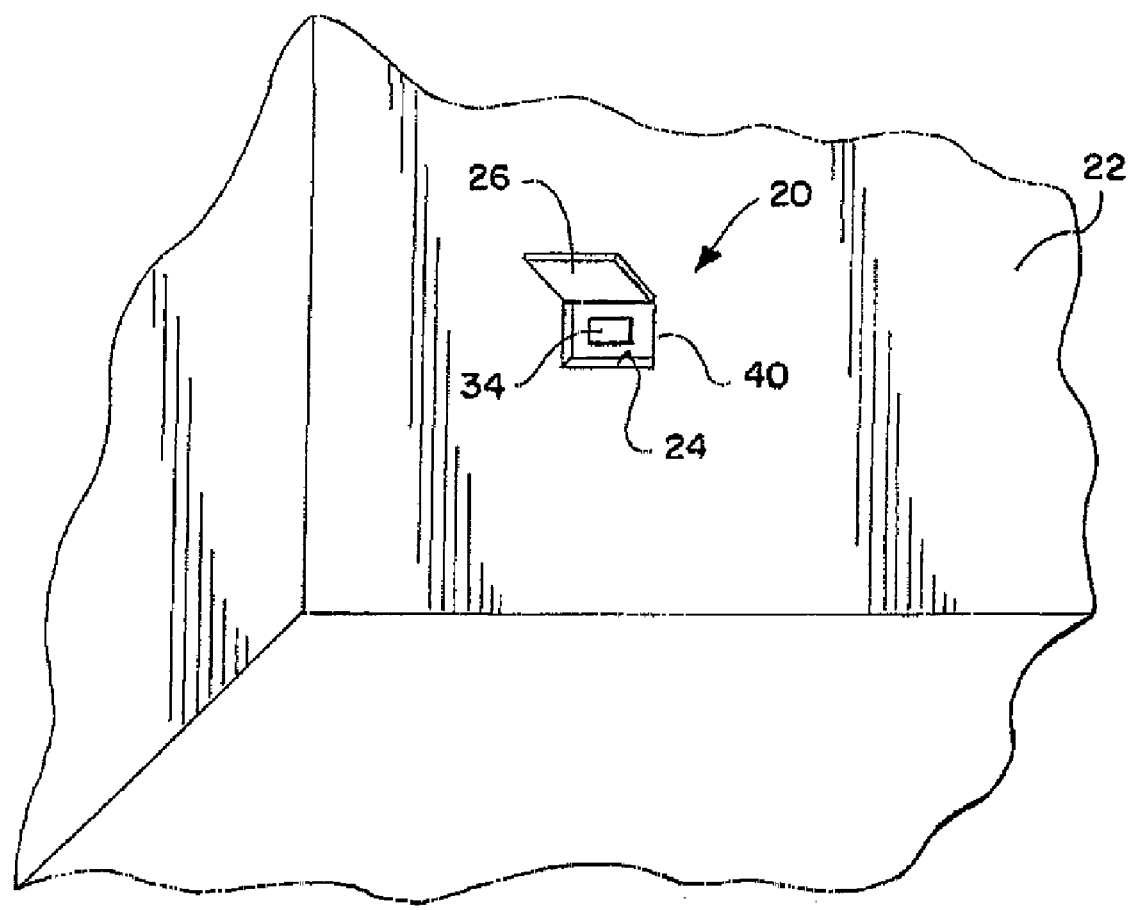
FIG. 1 is a perspective view of the electronic control panel housing of the pending disclosure shown mounted within a wall.

While the present disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Turning now to the drawings, and with specific reference to FIG. 1, an architectural concealment housing constructed in accordance with the teachings of the present disclosure is generally referred to by reference numeral 20. As shown therein, the housing 20 is adapted to be recessed into a wall 22 such as an interior wall of a home or building so as to be substantially flush with the wall 22. As will be described in further detail herein, the housing 20 can be manufactured in a number of different manners with the overall goal being to provide an enclosure which can be used to conceal wall mounted electrical devices, and thereby reduce their visible appearance and improve the aesthetics of the overall room. As used herein, wall-mounted electrical devices includes but is not limited to, power outlets, light switches, thermostats, alarm key pads, and home electronic control panels.

Referring now to FIGS. 1-3, the housing 20 is shown in further detail to include a base or access frame 24 to which a lid or access door 26 is hinged. The access flame 24 includes a bottom wall 28 from which the four side walls 30 outwardly extend. In so doing, the access frame 24 forms a storage space 32 for receipt of an electronic control panel 34, or other wall-mounted electrical device as described above. The upper edges 36 of each side wall 30 flare outwardly in the form of flanges 38 which are parallel to the bottom wall 28. When installing the housing 20, it is the access frame 24 which is attached to a wall stud for secure attachment to the wall 22. More specifically, an opening 40 is made into the wall 22 through which the bottom wall 28 and side walls 30 are inserted so as to be recessed within the wall 22. The access frame 24 is so inserted until the flanges 38 engage the wall 22. The flanges 38 engage the wall 22 in a substantially flush configuration. In order to secure the access frame 24 to the wall (not shown), conventional wall screws or other fasteners can be drilled through the side walls 30 and into the stud as needed.

Figure 4:
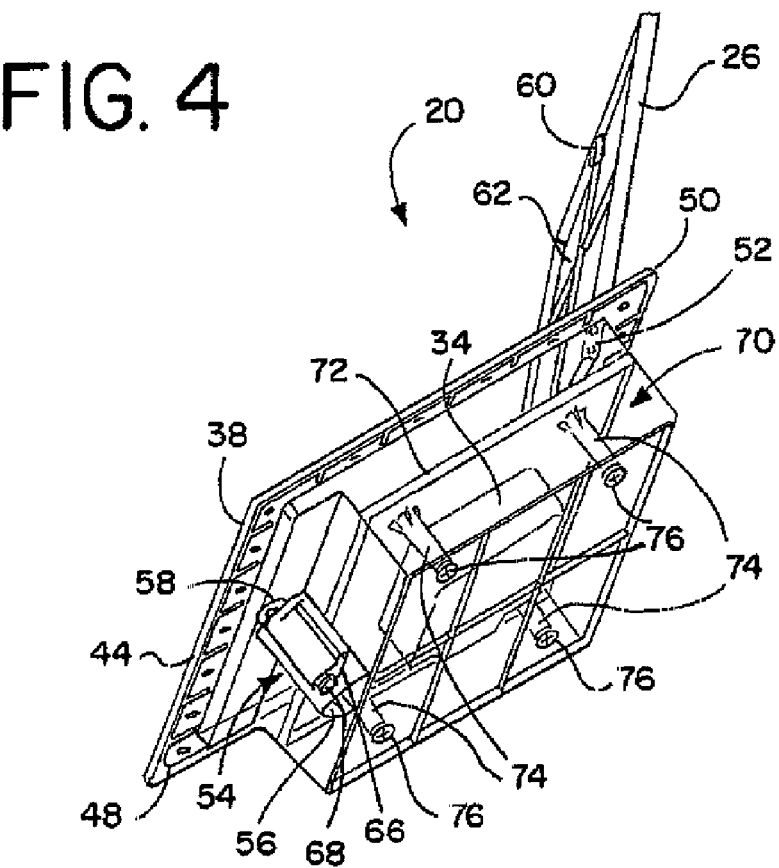
FIG. 4 is a rear perspective view with portions of the housing shown in transparency.
Figure 5:
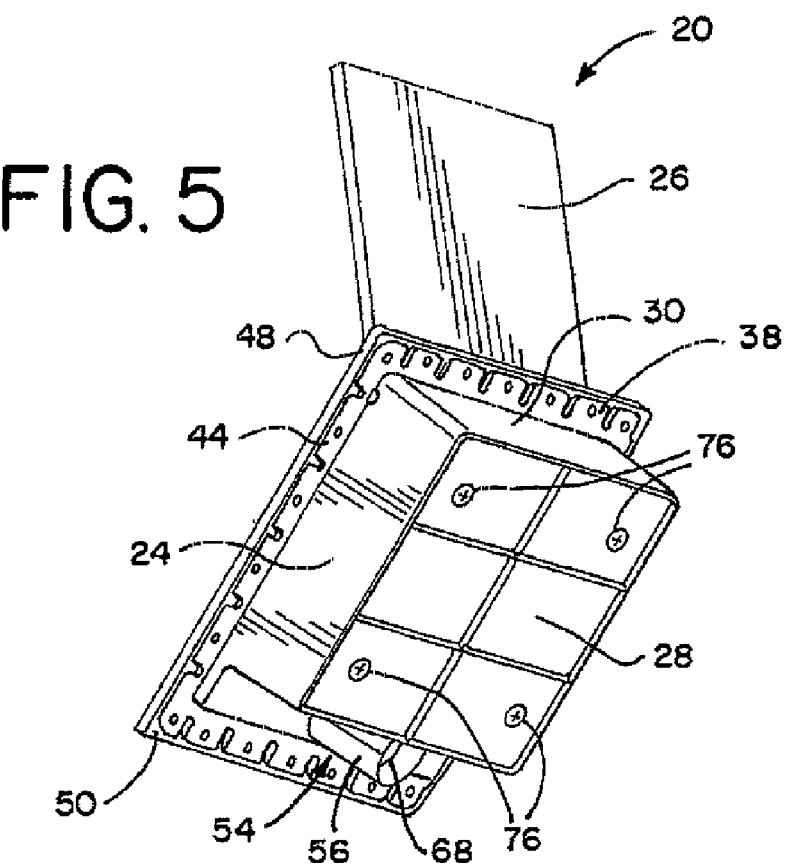
FIG. 5 is a real perspective view of the housing of FIG. 2.

The housing 20 may also further include an access door face plate 42 which is sized to be snap-fit over the periphery 44 formed by the flanges 38, as shown best in FIGS. 4 and 5. More specifically, the access door face plate 42 is substantially rectangular in configuration, with each of the four sides of the face plate 42 having a flat face 46 from which a rearwardly extending rim 48 depends. In so doing, a recess 50 is formed for receipt of the flanges 38. In the configuration wherein the door face plate 42 is used, the access door 26 would be hinged to the access door face plate 42 as opposed to the access flame 24. Usage of either embodiment is dictated by the home owner depending on whether it is desired to have the housing 20 fully recessed and flush with the wall 22 or protruding from the wall. In the former situation, the access door face plate 42 would not be used, and in the latter, the door face plate 42 would be used. The face plate 42 is also interchangeable thereby allowing various appearances to be provided depending upon the décor of the room in which the housing 20 is used. In addition, while not depicted the housing 20 could be equipped with a sensor enabling infrared communication between the electrical device inside the housing and a remote control even when the lid 26 is closed.

With respect to the lid 26, it can be shown to include pivots 52 adapted to be received either into the access flame 24, side walls 30, or the access door face plate 42 (see FIG. 4). The lid 26 pivots about the pivots 52 between the closed position depicted in FIG. 3 and the open position depicted in FIG. 2. While the door is depicted in FIG. 2 as being opened more than 90° away from the housing 20, it is to be understood that any number of different angular rotational ranges ale possible. In addition, while the access frame 24 is shown at only one size, it is to be understood that the teachings of the disclosure could be used to manufacture various other sizes, including but not limited to housings adapted to stoic multiple switches, outlets or control panels.

In order to temporarily secure the door 26 in either of the positions of FIG. 2 or 3, catches are provided. In the closed configuration, the catch can be provided by way of a clasp assembly 54. In such an assembly 54, the clasp could be positioned within the access frame 24 and, in the depicted embodiment, a recess 56 is provided for receipt of a clasp head 58. Similarly, a recess 60 may be provided on the inside surface 62 of the access door 26 for frictional receipt of the clasp head 58 such that when the lid 26 is closed, the clasp head 58 is frictionally interfit into the recess 60 and the door is held in the closed position.

The clasp assembly 54 may further include a spring 66 with a plunger 68 adapted to move between unlocked and locked positions. In the locked position, the plunger 68 moves against the spring 66 to compress the spring 66 and allow the door 26 to be fully received against the access flame 24. In the unlocked position, the spring 66 forces the plunger 68 outwardly thereby pushing the clasp head 58 outwardly and in turn pushing the access door 26 outwardly to allow the user to grasp the door 26 and pivot it away from the access flame 24 to the open position. It is to be understood that in alternative embodiments, the clasp assembly so described may not be used but any other form of conventional latch, such as but not limited to magnets, could be used. In addition, no latch at all need be provided and the door could simply be held in a closed position by way of gravity. However, the depicted embodiment provides a mechanism not only by which the door can be held closed, but be held closed such that the door is flush to the housing and thereby provide the desired aesthetics for the overall housing 20.

Depending upon the wall-mounted electrical device to be stored within the housing 20, the depth of the housing 20 may be adjusted. Of course, the degree to which the housing can be adjusted is dependent upon the overall depth of the wall in which the housing is mounted, but assuming the wall has at least the depth of a conventional 2×4 wall stud, even within the 3½ inches afforded therein, the depth can be adjusted according to the teachings of the disclosure. In order to adjust the depth of the housing 20, the access door spacer assembly 70 can be used. As shown best in FIG. 4, the access door spacer assembly 70 may include an access door spacer assembly plate 72 from which a plurality of spacer legs 74 extend. In the depicted embodiment, four spacer legs 74 are used but in alterative embodiments, more or less legs can be used. Each of the legs 74 is internally tapped so as to provide threads for receipt of a threaded fastener 76. From the views depicted in FIGS. 4 and 5, it can be seen that the fasteners 76 can be inserted through the bottom wall 28 of the access flame 24 and into the spacer legs 74 so as to secure the access flame 24 to the spacer assembly 70. The depth to which the housing 20 is adjusted is therefore dependent upon the length of the spacer legs 74. These can either be manufactured so as to be easily frangible at distinct incremental dimensions, or they can simply be shortened by the installer at the time of installation. In certain embodiments, the spacer assembly 70 will not be used at all as the maximum depth of the housing 20 may be desired.

In order to allow for electrical connection to the wall-mounted electrical device panel, one or more apertures (not shown) may be provided in the base 24. Such openings may be provided in the bottom wall 28, or any of the side walls 30. The apertures should be sized to allow passage of electrical leads therethrough.

From the foregoing, it can be seen that the teachings of the disclosure can be used to manufacture a housing adapted to be recessed into the wall of a home or building and thereby provide a storage space for any desired apparatus. In the depicted embodiment, the stored apparatus is an electronic control panel such as a thermostat or a digital control for the audio/video components of the home but could also be used for storage of other wall-mounted electrical devices, keys, cameras, valuables, or the like. However, by recessing the housing into the wall, the overall appearance of the wall is substantially undisturbed and the aesthetics of the room are improved.

Figure 6:
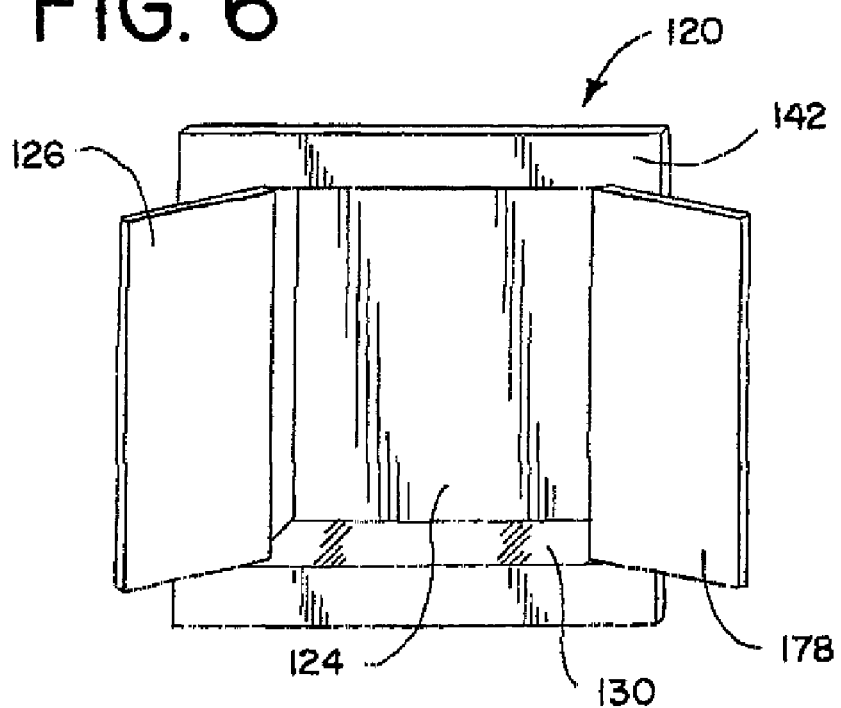
FIG. 6 is a perspective view of an alternative embodiment of an enclosure constructed in accordance with the teachings of the disclosure and depicting dual hinged doors.

In the embodiments of FIGS. 6-1, six other alternative embodiments are depicted. However, the overall provision of a recessed housing is provided with respect to each. In the embodiment of FIG. 6, the difference with respect to the first configuration is that more than one door 126 is provided. As shown, a first door 126 is provided on a left side of a housing 120 with a second door 178 being provided on the right side. Accordingly, while not depicted, one or more clasp assemblies could be provided with respect to each door. All remaining parts are the same as with the first embodiment and thus the reference numerals are the same but for the inclusion of a one hundred series prefix. Similarly, with later described embodiments, the same numbering sequence will be maintained with only the prefix being altered.

Figure 7:
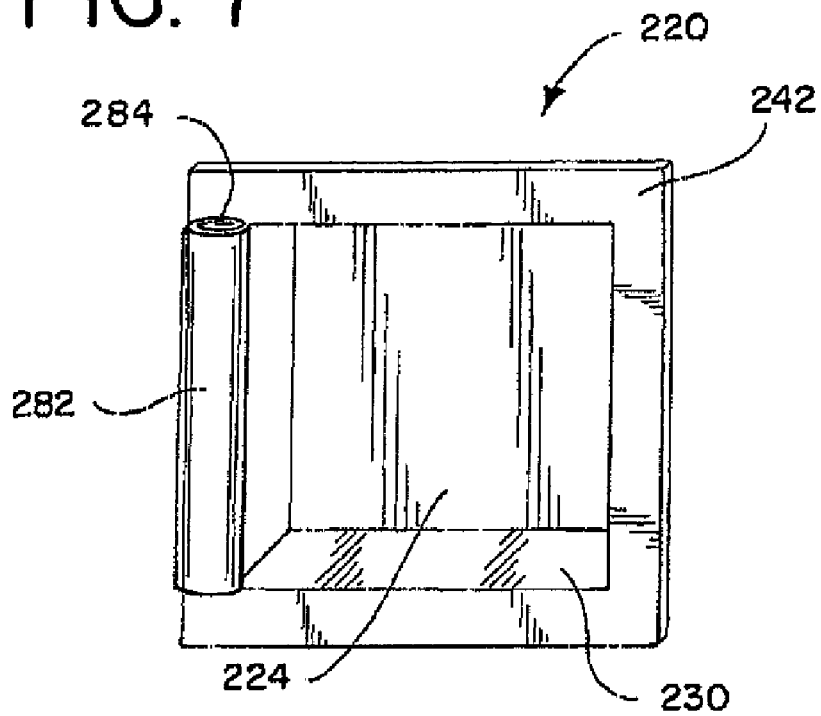
FIG. 7 is a perspective view of another alternative embodiment of an enclosure constructed in accordance with the teachings of the disclosure and depicting a roll-up door.

In the embodiment depicted in FIG. 7, a difference is that as opposed to having the access door which is hingeably swung away from a housing 220, the door 282 is provided so as to be coiled or rolled into an open position and uncoiled or unrolled into a closed configuration. In so doing, an axle 284 is provided about which the door can be rolled. The axle 284 may or may not be spring biased into the open configuration such that when the door 282 is unlatched, the spring force causes the door to automatically roll into the open position. If a spring is not provided, a crank or the like would need to be provided to allow for rolling and unrolling.

Figure 8:
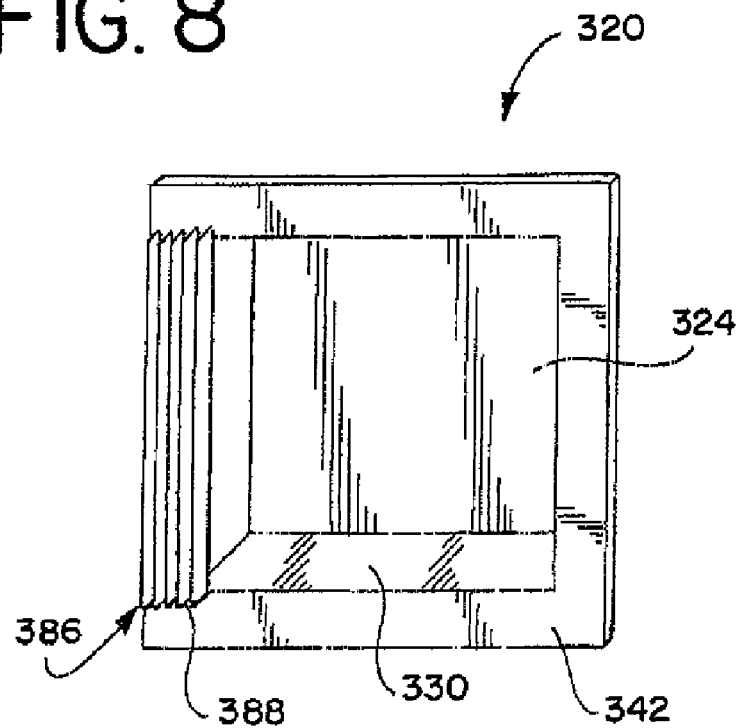
FIG. 8 is a perspective view of a third alternative embodiment of an enclosure constructed in accordance with the teachings of the disclosure and showing a door in an accordion fold type configuration.

In the embodiment of FIG. 8, an accordion door 386 is provided and formed from a plurality of hinged segments 388. Accordingly, the door 386 can be opened by folding the segments into a configuration wherein each of those segments are provided in a stacked and parallel configuration, and unfolded into a closed position wherein each of the segments form a single plane. The housing 320 in all other respects is the same.

Figure 9:
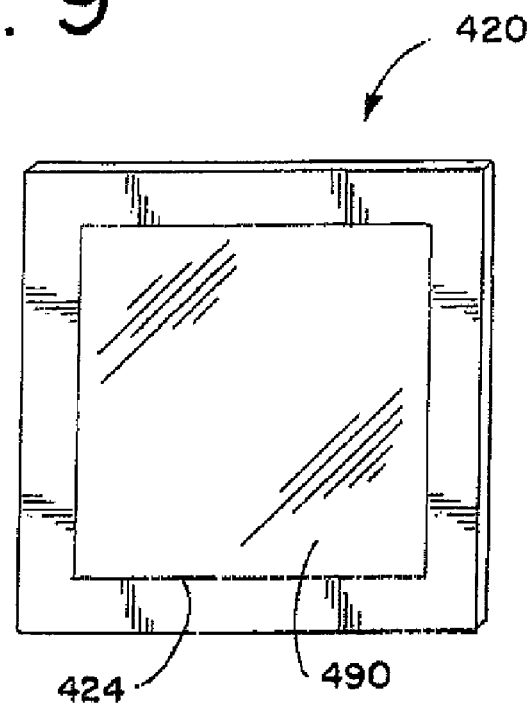
FIG. 9 is a fourth alternative embodiment of a housing constructed in accordance with the teachings of the disclosure and using a touch screen as a door.

With respect to the embodiment of FIG. 9, a housing 420 is not provided at all but rather a touch screen 490 is employed. In such an embodiment, the electronic control panel can be sized so as to be complementary to the overall interior size of the access frame 424. The entire front surface of the electronic control panel could be provided in the form of the touch screen 490 such that when the user wishes to make an adjustment, the screen 490 can simply be touched with the appropriate signal thereby being generated. When not in use, the touch screen could fade to black so as to substantially not interfere with the aesthetics of the room in that the housing still remains flush mounted to the wall.

Figure 10:
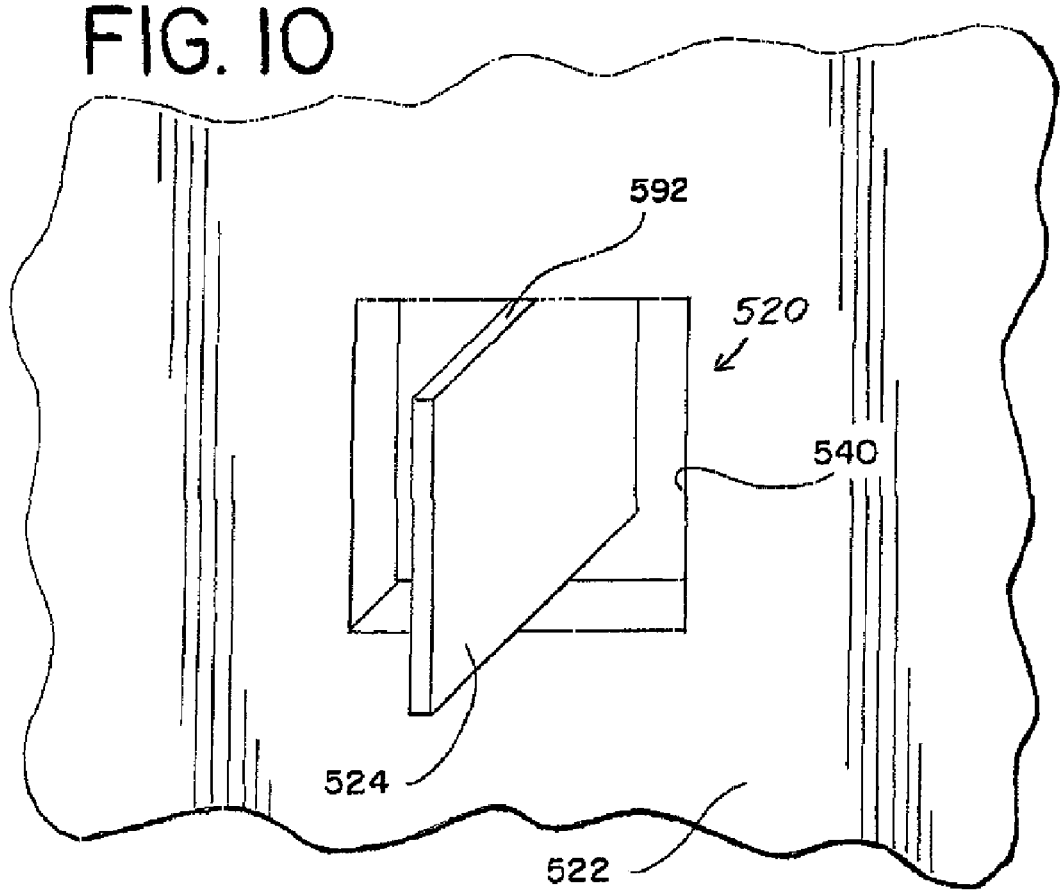
FIG. 10 is a fifth alternative embodiment depicting a housing adapted to rotate within the wall.

With respect to the embodiment in FIG. 10, the housing 520 is mounted in a rotational fashion to the wall 522. The housing 520 could be provided with upper and lower pivots 592 such that the housing can swivel about pivots 592. In a first position, the access flame 524 would be exposed outwardly into the room, and in a second position the access flame 524 would be rotated 180° away from the accessible position. In the second position, the access flame 524 would be rotated so as to face the interior of the wall 522. The apertures for passage of the electrical leads must in this embodiment be provided in the top or bottom wall of the access flame. Similarly, the pivots 592 could be provided on the left and right sides of the housing so as to allow the housing to rotate about a horizontal axis. In such an embodiment, the apertures for the electrical leads must be in the left or right walls of the access flame 24. In either embodiment, the user could simply push the housing into the desired position. With the embodiment of FIG. 10, the backside of the housing would be provided with a planar configuration perhaps matching the exact color of the paint on the wall or another form of wall covering provided on the wall in which the housing 520 is installed. In an alternative to manual positioning of the housing, the housing could be provided with a sensor, such as a motion sensor, such that upon the user waving his or her hand or the like in front of the housing, a motor would be automatically actuated to thereby drive the housing into the accessible or inaccessible position. The sensor of course could also be voice, keypad, infrared activated by way of remote, or the like.

Figure 11:
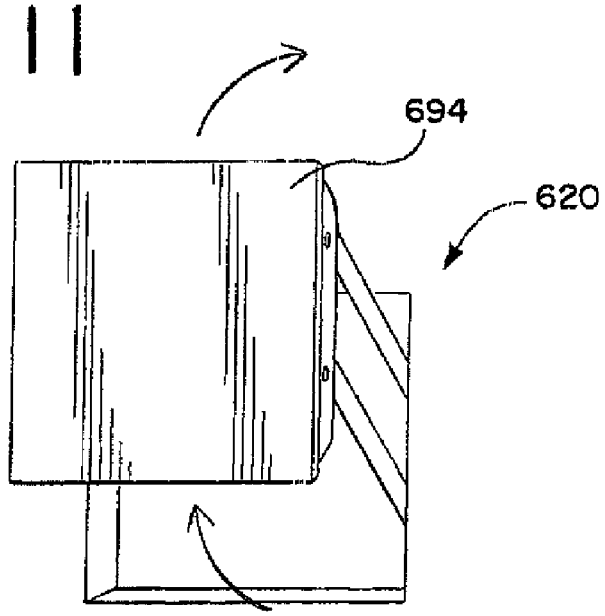
FIG. 11 is a sixth alternative embodiment depicting a housing with a lid adapted to fold up and then swing toward the wall when opened.

Finally, with respect to the sixth embodiment of FIG. 11, the housing 620 is equipped with a dual action door 694 adapted to pull out away from the wall and pivot up and back toward the wall. Conversely, when closing, the door 694 is first swung down, and then pushed back in. Similarly, while not shown, the door would first swing up parallel to be ground, and then slide into the housing.

From the foregoing, it can be seen that the teachings of the disclosure can be used to construct an architecturally concealed enclosure to provide the home owner or building owner with an additional storage space. The storage space can be used for wall-mounted electrical devices such as power outlets, light switches, alarm key pads, thermostats, or audio/video controls, or could simply be used to store ordinary objects such as keys or the like. The housing includes a base which is recessed into the wall itself with a door which is movable or usable in various fashions so as to be opened or closed at the direction of the user.

What is claimed is:

1. A housing for concealing wall-mounted electrical devices recessable into a wall, comprising:
   a base having a bottom wall and four side walls extending from the bottom wall forming an enclosure with an open top; and
   a lid hinged to the base and movable from at least a first position where the lid extends across the open top parallel to the bottom wall, and a second position where the lid is pulled away from the open top and is non-parallel to the bottom;

wherein the housing further comprises an access door spacer assembly adapted to adjustably control depth of access within the enclosure, the spacer assembly including:
a) an access plate mounted within the enclosure and positioned parallel to the base; and
a plurality of spacer legs depending from the plate, wherein the spacer legs extend between the access plate and the base, and wherein the spacer legs include a plurality of frangible increments to enable the length of each leg and thus the depth of the access within the enclosure leg to be adjusted by breaking off one or more of the frangible increments.

2. The housing of claim 1, wherein the base further includes a circumferential flange extending about the four side walls.

3. The housing of claim 2, wherein the lid lies in the same plane as the circumferential flange when in the first position.

4. The housing of claim 1, further including a first catch to hold the lid in the second position and a second catch to hold the lid in the first position.

5. The housing of claim 4, wherein the lid is pivotable over more than ninety degrees of rotation.

6. The housing of claim 1, wherein the base includes at least one opening to allow for passage of electrical leads to and from the wall-mounted electrical device.

7. The housing of claim 1, wherein the lid includes a handle.

8. An electronic control panel housing assembly, comprising:
a base having a bottom wall and four side walls extending from the bottom wall forming an enclosure with an open top;
a lid hinged to the base and movable from at least a first position where the lid extends across the open top parallel to the bottom wall, and a second position where the lid is pulled away from the open top and is non-parallel to the bottom; and
an electronic control panel positioned within the base against the bottom wall;
wherein the housing assembly further comprises an access door spacer assembly adapted to adjustably control depth of access within the enclosure, the spacer assembly including:
b) an access plate mounted within the enclosure and positioned parallel to the base; and
a plurality of spacer legs depending from the plate, wherein the spacer legs extend between the access plate and the base for securement of said plate to said base, and wherein the spacer legs includes a plurality of frangible increments to enable the length of each leg and thus the depth of the access within the enclosure leg to be adjusted by breaking off one or more of the frangible increments.

9. The electronic control panel housing assembly of claim 8, wherein the base further includes a circumferential flange extending about the four side walls.

10. The electronic control panel housing assembly of claim 9, wherein the lid lies in the same plane as the circumferential flange when in the first position.

11. The electronic control panel housing assembly of claim 8, further including a first catch to hold the lid in the second position, and a second catch to hold the lid in the first position.

12. The electronic control panel housing assembly of claim 11, wherein the lid is pivotable over more than ninety degrees of rotation.

13. The electronic control panel housing assembly of claim 8, wherein the base includes at least one opening to allow for passage of electrical leads to and from the electronic control panel.

14. The electronic control panel housing assembly of claim 8, wherein the lid includes a handle.

15. A method of mounting an electronic control panel into a wall, comprising:
providing an opening in a wall;
mounting a base into the wall, the base having a bottom wall and four side walls extending away from the bottom wall forming an enclosure with an open top, the bottom wall and side walls being recessed into the opening in the wall;
inserting an access door spacer assembly into the enclosure to adjustably control depth of access within the enclosure, such that an access plate of the spacer assembly is spaced from and positioned parallel to the base, and spacer legs depending from the access plate are secured to the base; each spacer leg including a plurality of frangible increments;
adjusting the depth of access by breaking off one or more of the frangible increments from each spacer leg;
positioning an electronic control panel into the access plate; and
closing a lid relative to the base, the lid being hinged to the base, the lid being movable from at least a first position where the lid extends across the open top parallel to the bottom wall, and a second position where the lid is pulled away from the open top and is non-parallel to the bottom want.

16. The method of mounting an electronic control panel into a wall of claim 15, further including providing a circumferential flange extending about the four side walls and mounting the base into the wall such that the circumferential flange engages the wall.

17. The method of mounting an electronic control panel into a wall of claim 16, where the lid lies in the same plane as the circumferential flange when in the first position.

18. The method of mounting an electronic control panel into a wall of claim 15, further including providing a first catch to hold the lid in the second position and a second catch to hold the lid in the first position.

19. The method of mounting an electronic control panel into a wall of claim 18, wherein the lid is pivotable over more than ninety degrees of rotation.

20. The method of mounting an electronic control panel into a wall of claim 15, further including extending at least one electrical lead from the electronic control panel through at least one opening provided in the base.

* * * * *